United States Patent
Kim

(10) Patent No.: US 11,695,939 B2
(45) Date of Patent: Jul. 4, 2023

(54) ADAPTIVE CODING UNIT (CU) PARTITIONING BASED ON IMAGE STATISTICS

(71) Applicant: TEXAS INSTRUMENTS INCORPORATED, Dallas, TX (US)

(72) Inventor: Hyung Joon Kim, Johns Creek, GA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/499,301

(22) Filed: Oct. 12, 2021

(65) Prior Publication Data

US 2022/0046252 A1  Feb. 10, 2022

Related U.S. Application Data

(63) Continuation of application No. 14/083,423, filed on Nov. 18, 2013, now Pat. No. 11,178,407.

(60) Provisional application No. 61/727,938, filed on Nov. 19, 2012.

(51) Int. Cl.
*H04N 19/176* (2014.01)
*H04N 19/14* (2014.01)
*H04N 19/119* (2014.01)

(52) U.S. Cl.
CPC ......... *H04N 19/176* (2014.11); *H04N 19/119* (2014.11); *H04N 19/14* (2014.11)

(58) Field of Classification Search
CPC ........... H04N 19/00212; H04N 19/119; H04N 19/14; H04N 19/176
See application file for complete search history.

(56) References Cited

U.S. PATENT DOCUMENTS

| 8,861,615 | B2* | 10/2014 | Sjoberg | H04N 19/31 375/240.26 |
|---|---|---|---|---|
| 2005/0128306 | A1* | 6/2005 | Porter | G06V 10/22 348/207.99 |
| 2008/0253454 | A1 | 10/2008 | Imamura et al. | |
| 2011/0274162 | A1* | 11/2011 | Zhou | H04N 19/60 375/240.03 |
| 2012/0183080 | A1 | 7/2012 | Zhou | |

(Continued)

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215 Mar. 16-23, 2011, Geneva, Switzerland.

(Continued)

*Primary Examiner* — Jae N Noh
(74) *Attorney, Agent, or Firm* — Carl G. Peterson; Frank D. Cimino

(57) ABSTRACT

A method for determining coding unit (CU) partitioning of a largest coding unit (LCU) of a picture is provided that includes computing a first statistical measure and a second statistical measure for the LCU, selecting the LCU as the CU partitioning when the first statistical measure does not exceed a first threshold and the second statistical measure does not exceed a second threshold, and selecting CUs in one or more lower layers of a CU hierarchy of the LCU to form the CU partitioning when the first statistical measure exceeds the first threshold and/or the second statistical measure exceeds the second threshold.

20 Claims, 6 Drawing Sheets

(56) References Cited

U.S. PATENT DOCUMENTS

| | | | |
|---|---|---|---|
| 2013/0003868 A1 | 1/2013 | Sjoberg et al. | |
| 2014/0086314 A1* | 3/2014 | Hebel | H04N 19/124 375/E7.126 |
| 2014/0355690 A1* | 12/2014 | Choi | H04N 19/436 375/240.24 |
| 2015/0010056 A1 | 1/2015 | Choi et al. | |
| 2015/0131713 A1 | 5/2015 | Kim et al. | |

OTHER PUBLICATIONS

Benjamin Bross et al, "WD4: Working Draft of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-217, Jul. 14-22, 2011, Torino, Italy.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

Il-Koo Kim et al, "HM7: High Efficiency Video Coding (HEVC) Test Model 7 Encoder Description", JCTVC-I1002, Joint Collaborative Team on Video Coding (JCT-VC) of ITU-T SG16 WP3 and ISO/IEC JTC1/SC29/WG11, pp. 1-50, Apr. 27-May 7, 2012, Geneva, Switzerland.

Benjamin Bross et al, "High Efficiency Video Coding (HEVC) Text Specification Draft 7", JCTVC-I1003_d9, Joint Collaborative Team on Video Coding (JCT-VC) of ITU-T SG16 WP3 and ISO/IEC JTC1/SC29/WG11, pp. 1-260, Apr. 27-May 7, 2012, Geneva, Switzerland.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-250, Jul. 11-20, 2012, Stockholm, Sweden.

Benjamin Bross et al, "High Efficiency Video Coding (HEVC) Text Specification Draft 9", JCTVC-K1003_v12, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

Benjamin Bross et al, High Efficiency Video Coding (HEVC) Text Specification Draft 10 (for FDIS & Last Call), JCTVC-L1003_v34, Joint Collaborative Team on Video Coding (JCT-VC) of ITU-T SG16 WP3 and ISO/IEC JTC1/SC29/WG11, pp. 1-298, Jan. 14-23, 2013, Geneva, Switzerland.

"TMS320DM6467 Digital Media System-on-Chip", SPRS403G, Texas Instruments Incorporated, Dec. 2007, revised Oct. 2010, pp. 1-355.

* cited by examiner

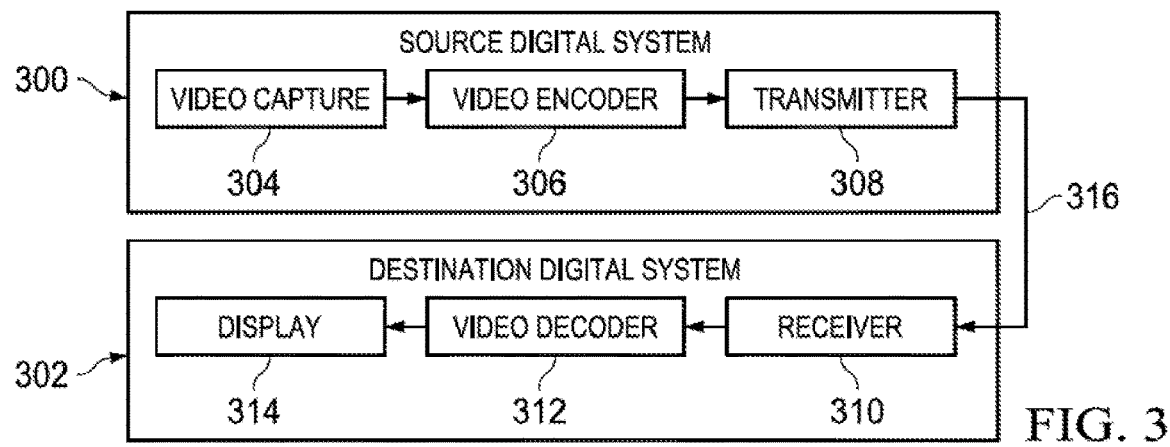
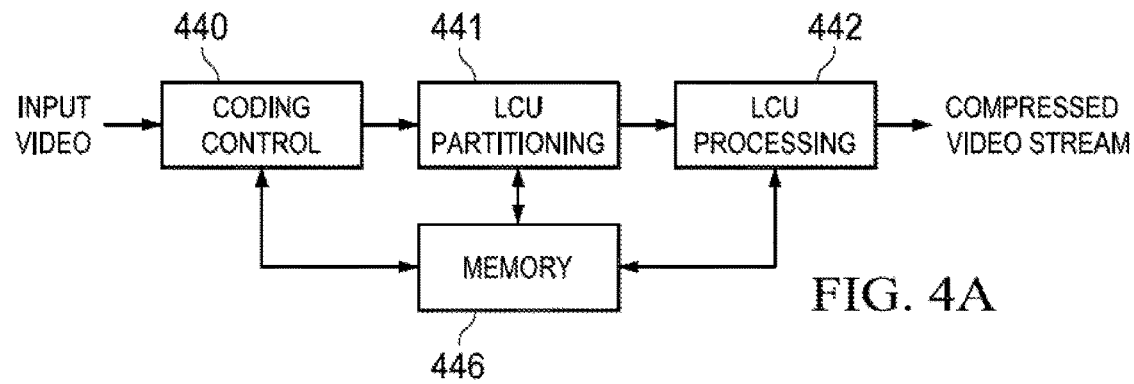
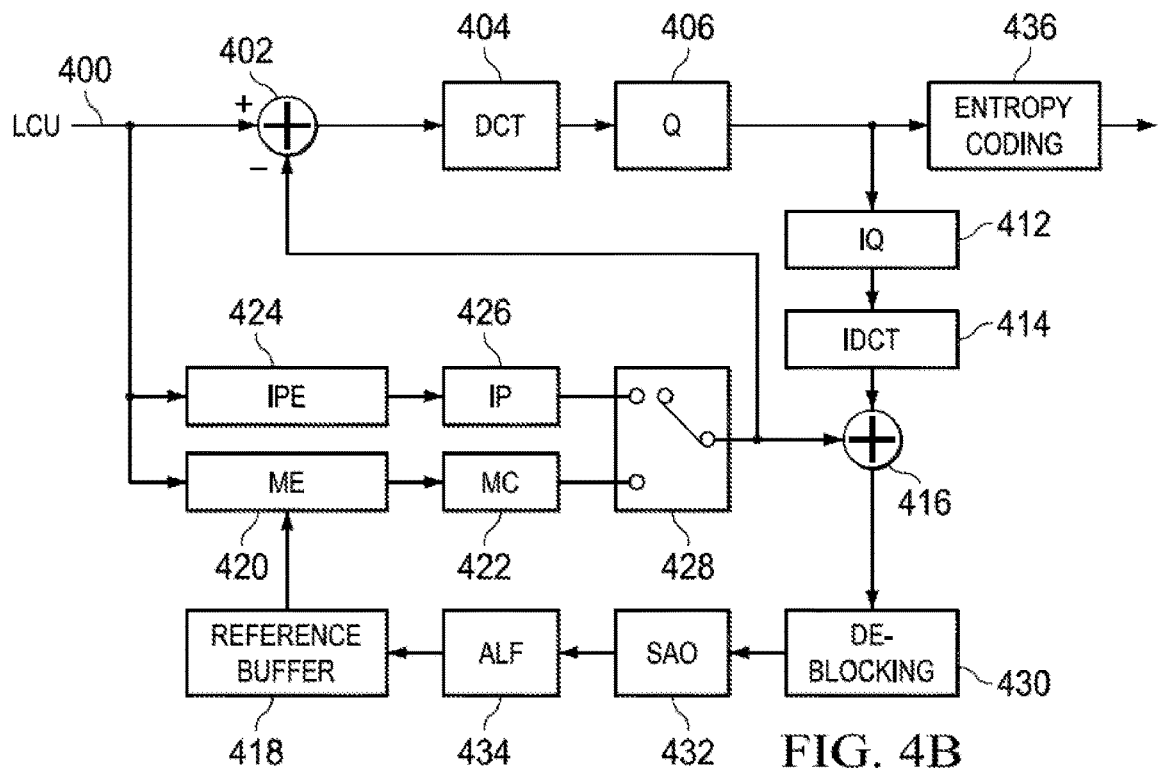
FIG. 3
FIG. 4A
FIG. 4B

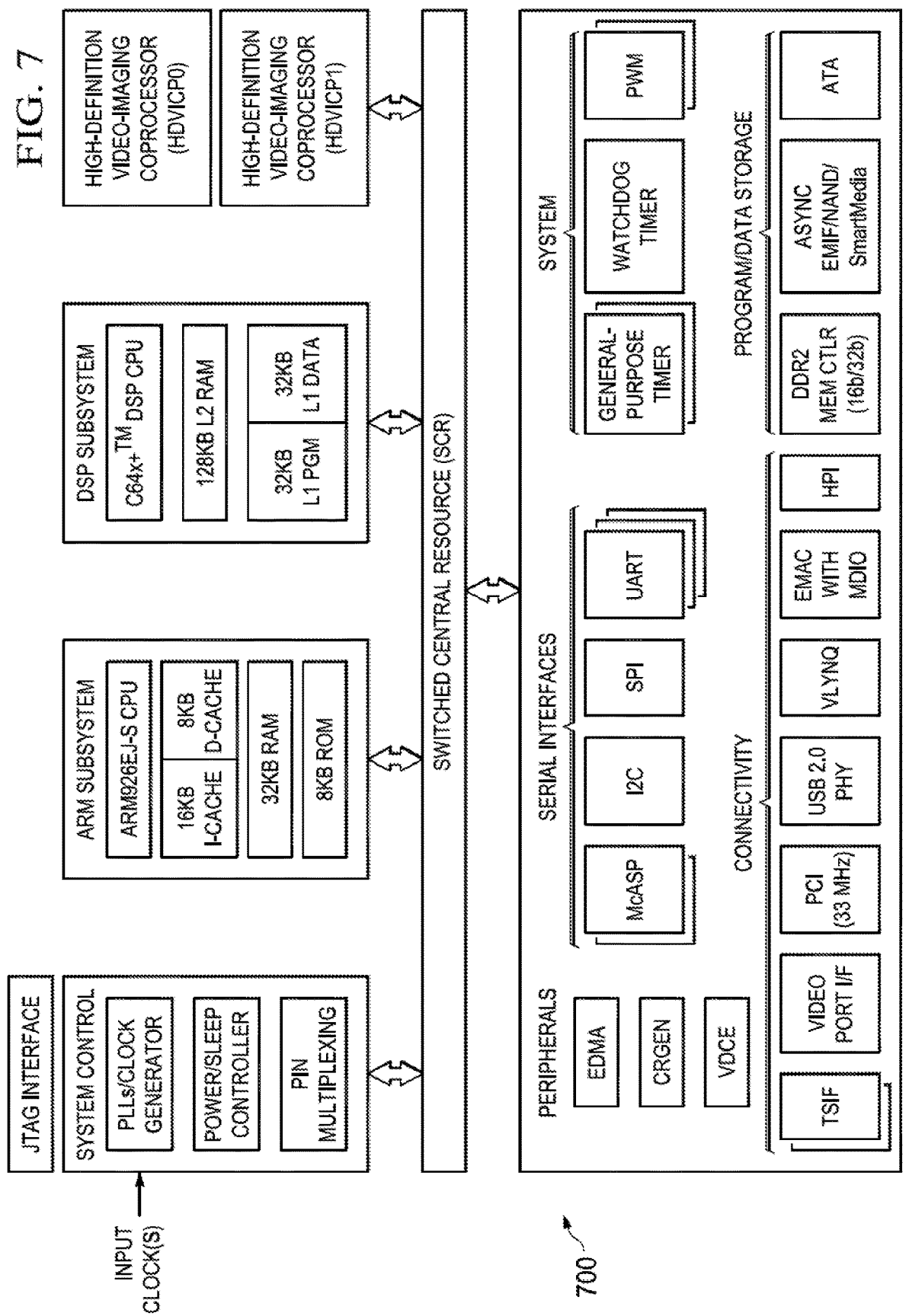

ADAPTIVE CODING UNIT (CU) PARTITIONING BASED ON IMAGE STATISTICS

CROSS-REFERENCE TO RELATED APPLICATIONS

This application is a continuation of U.S. application Ser. No. 14/083,423 filed Nov. 18, 2013, which claims benefit of U.S. Provisional Patent Application Ser. No. 61/727,938 filed Nov. 19, 2012, which are both incorporated herein by reference in its entirety.

BACKGROUND OF THE INVENTION

Field of the Invention

Embodiments of the present invention generally relate video coding and more specifically relate to adaptive coding unit (CU) partitioning based on image statistics.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and entropy coding of the transform coefficients.

HEVC is expected to provide around 50% improvement in coding efficiency over the current standard, H.264/AVC, as well as larger resolutions and higher frame rates. To address these requirements, HEVC utilizes larger block sizes than the current video coding standard, H.264/AVC. More specifically, in HEVC, a largest coding unit (LCU) is the base unit used for block-based coding. An LCU plays a similar role in coding as the 16×16 macroblock of H.264/AVC, but it may be larger, e.g., 32×32 or 64×64. In HEVC, a picture is divided into non-overlapping LCUs. To maximize coding efficiency, each LCU may be partitioned into coding units (CU) of different sizes using recursive quadtree partitioning. The maximum hierarchical depth of the quadtree is determined by the size of the smallest CU (SCU) permitted. The quadtree partitioning of an LCU into CUs is determined by a video encoder during prediction based on, e.g., minimization of rate/distortion costs.

To achieve the best encoding performance, an HEVC encoder should perform an exhaustive search that considers all allowable CU sizes and all prediction modes for each CU size to select the best CU hierarchy for an LCU and the best prediction mode for each CU in the LCU, e.g., the CU hierarchy and prediction modes that produce the minimal rate-distortion (coding) cost. This exhaustive approach adds significant computational complexity to the prediction process in an encoder. Real-time encoders may have limited computational resources that do not allow for such an exhaustive search.

SUMMARY

Embodiments of the present invention relate to methods, apparatus, and computer readable media for adaptive CU partitioning based on image statistics is provided. In one aspect, a method for determining coding unit (CU) partitioning of a largest coding unit (LCU) of a picture is provided that includes computing a first statistical measure and a second statistical measure for the LCU, selecting the LCU as the CU partitioning when the first statistical measure does not exceed a first threshold and the second statistical measure does not exceed a second threshold, and selecting CUs in one or more lower layers of a CU hierarchy of the LCU to form the CU partitioning when the first statistical measure exceeds the first threshold and/or the second statistical measure exceeds the second threshold.

In one aspect, an apparatus configured to determine coding unit (CU) partitioning of a largest coding unit (LCU) of a picture is provided that includes means for computing a first statistical measure and a second statistical measure for the LCU, means for selecting the LCU as the CU partitioning when the first statistical measure does not exceed a first threshold and the second statistical measure does not exceed a second threshold, and means for selecting CUs in one or more lower layers of a CU hierarchy of the LCU to form the CU partitioning when the first statistical measure exceeds the first threshold and/or the second statistical measure exceeds the second threshold.

In one aspect, a computer readable medium storing software instructions is provided. The software instructions, when executed by at least one processor, cause a method for determining coding unit (CU) partitioning of a largest coding unit (LCU) of a picture to be performed. The method includes computing a first statistical measure and a second statistical measure for the LCU, selecting the LCU as the CU partitioning when the first statistical measure does not exceed a first threshold and the second statistical measure does not exceed a second threshold, and selecting CUs in one or more lower layers of a CU hierarchy of the LCU to form the CU partitioning when the first statistical measure exceeds the first threshold and/or the second statistical measure exceeds the second threshold.

BRIEF DESCRIPTION OF THE DRAWINGS

Particular embodiments will now be described, by way of example only, and with reference to the accompanying drawings:

FIG. 3 is a block diagram of a digital system;

FIGS. 4A and 4B are block diagrams of a video encoder;

FIG. 7 is a block diagram of an illustrative digital system.

DETAILED DESCRIPTION OF EMBODIMENTS OF THE INVENTION

Figure 1:
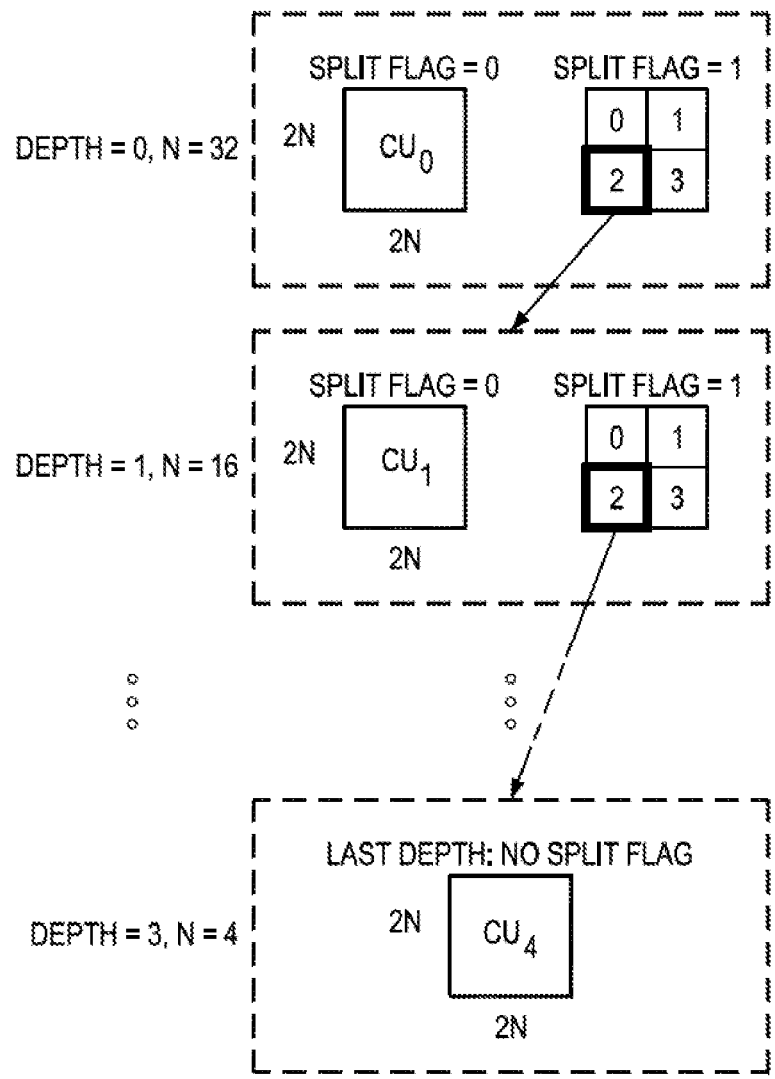
FIG. 1 is an example of quadtree based largest coding unit (LCU) decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-I1003_d9, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"), and B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, CH, Jan. 14-23, 2013 ("HEVC Draft 10").

As previously mentioned, in HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU) using recursive quadtree partitioning. A CU is a block of pixels within an LCU and the CUs within an LCU may be of different sizes. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

FIG. 1 shows an example of CU partitioning in which the LCU size is 64×64 and the maximum hierarchical depth is 3. The recursive structure, i.e., the partitioning, is represented by a series of split flags. For $CU_d$, which has depth d and size 2N×2N, the coding of the CU is performed in the current depth when split flag is set to zero. When the split flag is set to 1, $CU_d$ is split into 4 independent $CU_{d+1}$ which have depth (d+1) and size N×N. In this case, $CU_{d+1}$ is referred to as a sub-CU of $CU_d$. Unless the depth of sub-CU (d+1) is equal to the maximum allowed depth, each $CU_{d+1}$ is processed in a recursive manner. If the depth of sub-CU (d+1) is equal to the maximum allowed depth, further splitting is not allowed. For coding, a CU can be further split into PUs and TUs. The sizes of an LCU and SCU are specified in the Sequence Parameter Set (SPS). The embedded information in the SPS is LCU size (s) and the maximum hierarchical depth (h) in a LCU. For example, if s=64 and h=4, then 4 CU sizes are possible: 64×64 (LCU), 32×32, 16×16 and 8×8 (SCU). If s=16 and h=2, then 16×16 (LCU) and 8×8 (SCU) are possible.

Figure 2:
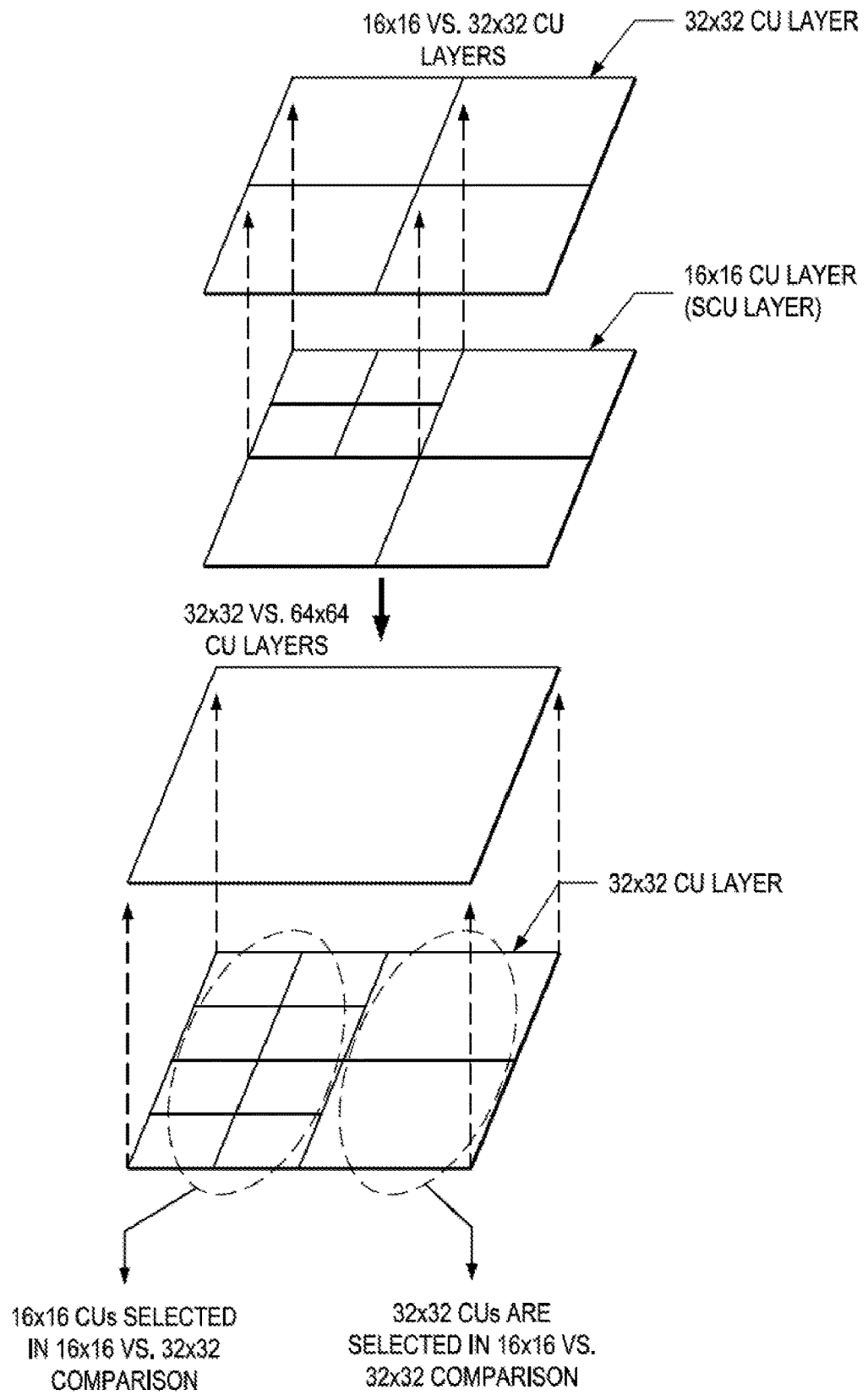
FIG. 2 is an example.

As previously mentioned, in some encoders, determination of the best CU structure and the best prediction mode (intra or inter) for a CU is performed bottom up, i.e., starting with the smallest possible CU partitioning and working up the hierarchy levels (layers). More specifically, for each CU of each CU size, starting with the smallest CU size, the encoder determines an intra-prediction coding cost for the CU, the best PU partition type for the CU, and an intra-prediction mode for each PU of the best partition type. Similarly, for each CU of each CU size, starting with the smallest CU size, the encoder determines an inter-prediction coding cost for the CU, the best PU partition type for the CU, and an inter-prediction mode for each PU of the best partition type. Put another way, the best CU partition sizes are selected by examining all CU layers in the hierarchy. First, the costs of CUs at lowest CU layer (smallest CU or SCU layer) are evaluated, and then cost of each parent CU (of the SCUs) is evaluated, and compared to the cost of SCUs. This process is repeated until largest CU (LCU) layer is reached. FIG. 2 is an example of this CU partitioning method in which the SCU size is assumed to be 16×16 and the LCU size is assumed to be 64×64. This exhaustive approach for determining prediction modes, while providing the best encoding efficiency, adds significant computational complexity to the prediction process in an encoder.

Embodiments of the invention provide top down adaptive CU partitioning of an image based on image statistics. Rather than determining the partitioning of an image using the bottom up exhaustive search based on coding costs of the prior art, the partitioning is determined top down and without consideration of coding costs and prediction modes. Once the partitioning is determined, prediction modes are then determined for the selected partitions. In general, for a given CU, two statistical measures are computed. If both measures do not exceed corresponding thresholds, the CU is selected as a partition of the image. If either measure exceeds the corresponding threshold, the CU is partitioned into child CUs, and the process is repeated for each child CU. In some embodiments, the two statistical measures are the variance of the CU and the gradient of the CU.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. As part of the encoding process, the video encoder component 306 may perform adaptive CU partitioning as described herein. An embodiment of the video encoder component 306 is described in more detail herein in reference to FIGS. 4A and 4B.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

FIGS. 4A and 4B show block diagrams of an example video encoder configured to perform adaptive CU partitioning based on CU statistics as part of the encoding process. FIG. 4A shows a high level block diagram of the video encoder and FIG. 4B shows a block diagram of the LCU processing component 442 of the video encoder. As shown in FIG. 4A, the video encoder includes a coding control component 440, an LCU partitioning component 441, an LCU processing component 442, and a memory 446. The memory 446 may be internal (on-chip) memory, external (off-chip) memory, or a combination thereof. The memory 446 may be used to communicate information between the various components of the video encoder.

An input digital video sequence is provided to the coding control component 440. The coding control component 440 sequences the various operations of the video encoder, i.e., the coding control component 440 runs the main control loop for video encoding. For example, the coding control component 440 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component 440 controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU partitioning component 441 determines the CU partitioning of each LCU and provides this partitioning to the LCU processing component 442. More specifically, the LCU partitioning component 441 performs an embodiment of the CU partitioning method of FIG. 5 on each LCU to determine the partitioning for encoding.

FIG. 4B is a block diagram of the LCU processing component 442. The LCU processing component 442 receives LCUs 400 of the input video sequence from the coding control component 440 and the CU partitioning of each of the LCUs 400 from the LCU partitioning component 441 and encodes the LCUs 400 under the control of the coding control component 440 to generate the compressed video stream. The LCUs 400 from the coding control component 440 and the CU partitioning for each LCU are provided as inputs to the motion estimation component (ME) 420 and to the intra-prediction estimation component (IPE) 424. The LCUs are also provided to a positive input of a combiner 402 (e.g., adder or subtractor or the like). Further, although not specifically shown, the prediction mode of each picture as selected by the coding control component 440 is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU (as per the CU partitioning determined by the LCU partitioning component 441) based on multiple inter-prediction modes (e.g., skip mode, merge mode, and normal or direct inter-prediction), PU sizes, and TU sizes using reference picture data from storage 418 to choose the best PU/TU partitioning, inter-prediction modes, motion vectors, etc. for each CU based on coding cost, e.g., a rate distortion coding cost. To perform the tests, the motion estimation component 420 may divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected PU/TU partitioning. The coding costs of the inter-predicted CUs are also provided to the mode decision component 428.

The intra-prediction estimation component 424 (IPE) performs intra-prediction estimation in which tests on CUs in an LCU (as per the CU partitioning determined by the LCU partitioning component 441) based on multiple intra-prediction modes, PU sizes, and TU sizes are performed using reconstructed data from previously encoded neighboring CUs stored in a buffer (not shown) to choose the best PU/TU partitioning and intra-prediction modes based on coding cost, e.g., a rate distortion coding cost. To perform the tests, the intra-prediction estimation component 424 may divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs, and the corresponding TU sizes for each CU in the CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected PU/TU partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component 440. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component 440 and the transform sizes and provides the quantized transform coefficients to the entropy coding component 436 for coding in the bit stream.

The entropy coding component 436 entropy encodes the relevant data, i.e., syntax elements, output by the various encoding components and the coding control component 440 to generate the compressed video bit stream. Among the syntax elements that are encoded are picture parameter sets, flags indicating the CU/PU/TU partitioning of an LCU, the prediction modes for the CUs, and the quantized transform coefficients for the CUs.

The LCU processing component 442 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

Figure 5:
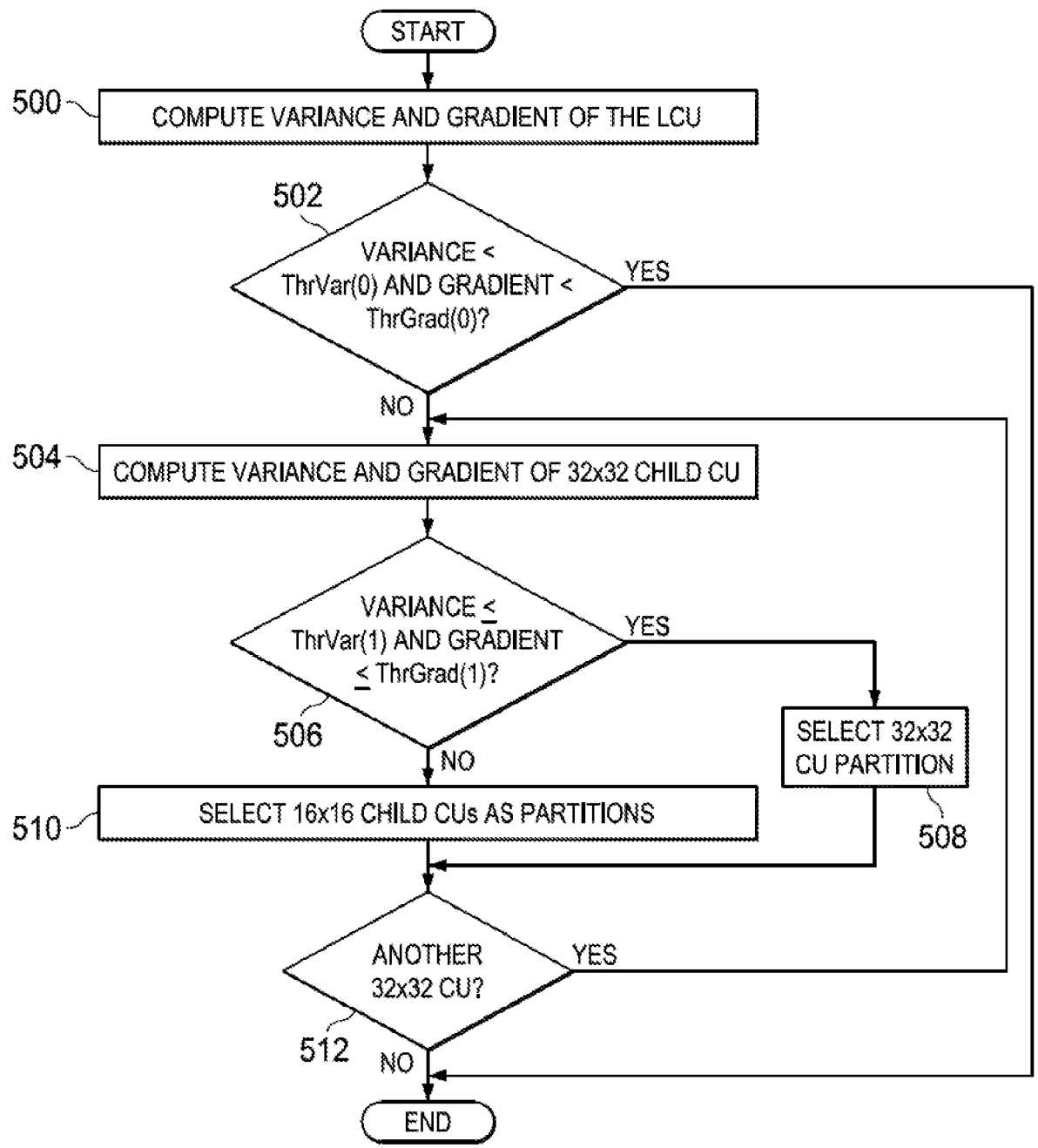
FIG. 5 is a flow diagram of a method for adaptive coding unit (CU) partitioning.

FIG. 5 is a flow diagram of a method for adaptive CU partitioning of an LCU based on image statistics. The method may be executed by an encoder such as that of FIGS.

4A and 4B to determine the CU partitioning of LCUs. For simplicity of explanation, embodiments are described herein assuming a 64×64 LCU and a hierarchy depth of 2. Thus, the smallest CU size is 16×16 and there are three layers in the hierarchy. One of ordinary skill in the art will understand other embodiments with differing LCU sizes and/or hierarchy depths.

The method determines the CU partitioning of an LCU top down, i.e., beginning at the top level (layer) of the CU hierarchy. For a given CU, the variance and gradient are computed and compared to variance and gradient thresholds, referred to respectively as ThrVar(n) and ThrGrad(n), where n is the index of the CU layer in the hierarchy. For example, n=0 indicates that the layer is the LCU layer, n=1 indicates that the CU layer is the 32×32 CU layer, and n=2 indicates that the CU layer is the 16×16 CU layer (SCU layer). If the variance and gradient are not larger than the respective thresholds, the CU is selected as a partition of the LCU. If the variance or gradient is larger than the respective threshold, the process is repeated for all child CUs of the CU, i.e., for child CUs at the (n+1) CU layer. Each threshold may have any suitable value and that value may be determined experimentally based on, for example, the particular application and/or expected content of video streams to be encoded.

As shown in FIG. 5, initially the variance and gradient of the LCU is computed 500. In general, variance is a measure of the dispersion of pixels values in a block of pixels around the mean pixel value of the block. Variance may be computed as the sum of the squared differences between each pixel in a block of pixels and the average pixel value of the block, i.e., $$\mathrm{var} = \Sigma_{m=0}^{m-1} (p_m - p_{avg})^2$$

where m is the number of pixels in the block and $p_{avg}$ is the average pixel value of the block.

In general, gradient is a measure of the directional change in the intensity or color of a block of pixels. The gradient includes both a horizontal gradient and a vertical gradient. The horizontal gradient of a block of pixels may be computed as the sum of the differences between each pixel in a block of pixels and the horizontally neighboring pixel, i.e., $$h = \sum_{col=0}^{col=s-2} \sum_{row=0}^{row=s-1} |p_{row,col} - p_{row,col+1}|$$

where s is the block size, e.g., 8, 16, 32, 64. The vertical gradient may be computed as the sum of the differences between each pixel in the block of pixels and the vertically neighboring pixel, i.e., $$v = \sum_{row=0}^{row=s-2} \sum_{col=0}^{col=s-1} |p_{row,col} - p_{row+1,col}|$$

where s is the block size, e.g., 8, 16, 32, 64. The gradient of the block is the sum of the horizontal gradient h and the vertical gradient v.

The variance and gradient computed for the LCU are then compared 502 to a variance threshold (ThrVar(0)) and a gradient threshold (ThrGrad(0)) for the LCU layer of the hierarchy. If both the variance and the gradient are less than or equal to the respective thresholds, the LCU partition is selected as the partitioning of the LCU and processing terminates. If one or both of the variance and the gradient are greater than the respective thresholds, processing continues with the four 32×32 child CUs of the LCU (504-512).

The variance and gradient of a 32×32 child CU is computed 504. The variance and gradient computed for the 32×32 child CU are then compared 506 to a variance threshold (ThrVar(1)) and a gradient threshold (ThrGrad(1)) for the 32×32 CU layer of the hierarchy. If both the variance and the gradient are less than or equal to the respective thresholds, the 32×32 partition is selected 508 as the part of the partitioning of the LCU and processing continue with the next 32×32 child CU, if any 512. If one or both of the variance and the gradient are greater than the respective thresholds, the 16×16 child CUs of the 32×32 CU are selected 510 as partitions of the LCU, and processing continues with the next 32×32 child CU, if any 512.

After the four 32×32 CUs are processed, the process terminated and the CU partitioning is returned for further processing in the encoding process. As was previously described, the encoder will then determine the best prediction mode and PU/TU configuration for each CU in the CU partitioning and encode the CUs according to the selected prediction modes and PU/TU configurations.

Figure 6:
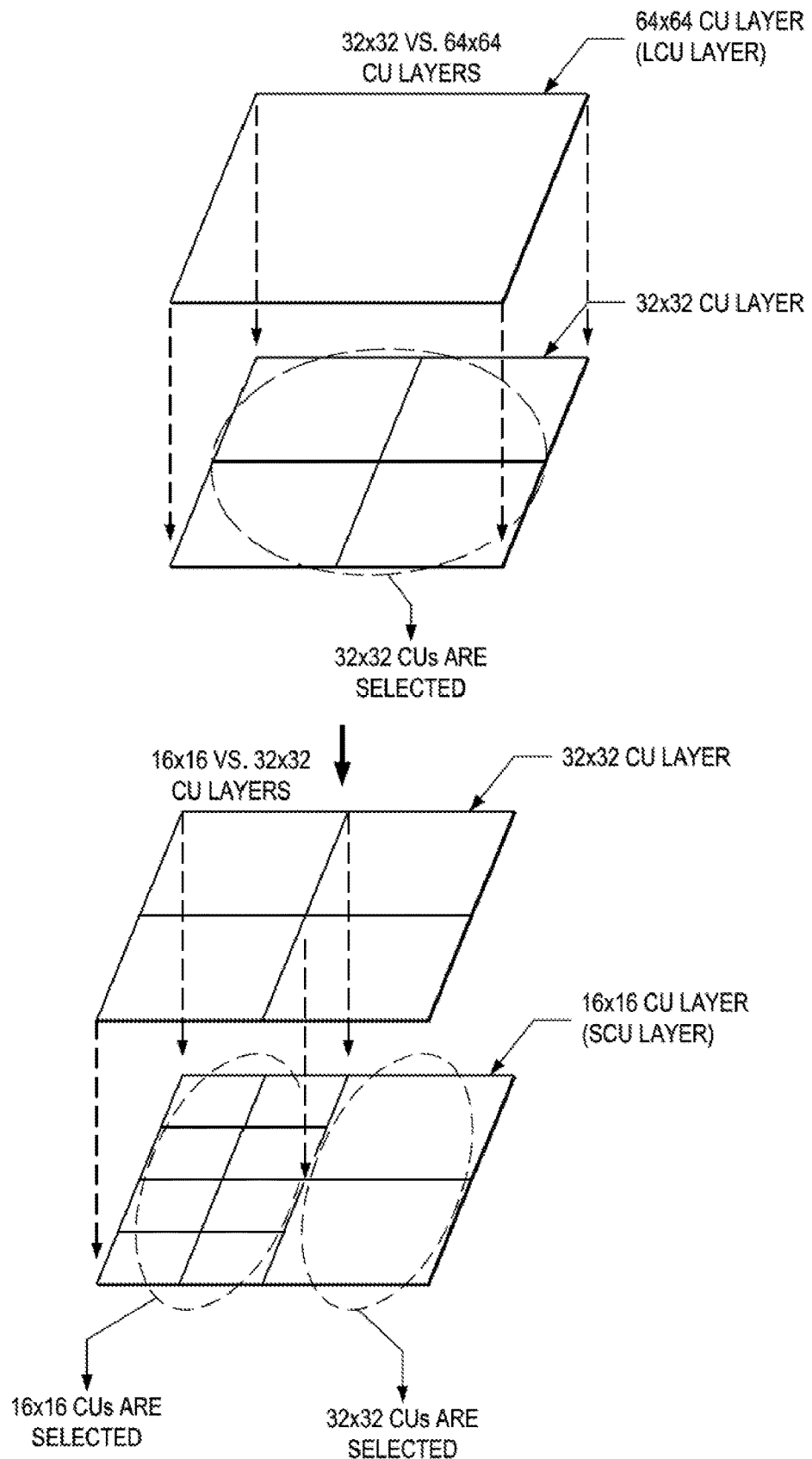
FIG. 6 is an example.

FIG. 6 is an example illustrating the method of FIG. 5. In this example, first the variance and gradient are computed for the LCU. Either one or both of these values is greater than the corresponding thresholds for the LCU layer, so the LCU is not selected as the CU partitioning and the four 32×32 child CU are selected as a possible partitioning. Each the 32×32 child CUs is then processed to determine if the particular CU should be a partition of the LCU. For each of the 32×32 child CUs, a gradient and threshold is computed and are compared to the respective corresponding thresholds for the 32×32 CU layer. The variance and gradient of the top right and bottom right 32×32 child CUs are both less than the corresponding thresholds, so these 32×32 CUs are selected as part of the CU partitioning of the LCU. One or both of the variance and gradient of the other two 32×32 child CUs exceeds the corresponding threshold, so the 16×16 child CUs of these 32×32 CUs are selected as part of the partitioning of the LCU.

FIG. 7 is a block diagram of an example digital system suitable for use as an embedded system that may be configured to encode a video sequence using a method for adaptive CU partitioning based on image statistics as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 700 is a programmable platform designed to meet the processing needs of applications such as video encode/decode/transcode/transrate, video surveillance, video conferencing, set-top box, medical imaging, media server, gaming, digital signage, etc. The SoC 700 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 700 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 700, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 700 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 7, the SoC 700 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 700 may be configured to encode a video sequence using a method for adaptive CU partitioning based on image statistics as described herein. For example, the coding control and the LCU partitioning of the video encoder of FIGS. 4A and 4B may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which each parent block has four child blocks. One of ordinary skill in the art will understand embodiments in which the number of child blocks may differ.

In another example, embodiments have been described herein in which variance is used as one of the image statistics for determination of CU partitioning. One of ordinary skill in the art will understand embodiments in which an alternative statistical measurement is used. For example, the previously described variance computation includes multiplication, which will require more logic gates in a hardware implementation. Instead of computing variance, the simple sum of absolute differences between pixel values and the average pixel value may be computed. This latter statistic computation can be implemented with fewer logic gates than the full variance computation.

In another example, embodiments have been described herein in which each layer of the CU hierarchy has corresponding gradient and variance threshold values. One of ordinary skill in the art will understand embodiments in which threshold values are normalized and thus there may only be one threshold value for each statistical measure, e.g., one threshold value for variance and one threshold value for gradient. Further, one of ordinary skill in the art will understand embodiments in which some layers may have unique threshold values while other layers share threshold values.

In another example, embodiments have been described herein in which gradient is used as one of the statistical measures in deciding the CU partitioning, where gradient is defined as the sum of the horizontal gradient and the vertical gradient. One of ordinary skill in the art will understand embodiments in which the horizontal and vertical gradients are used as statistical measures in lieu of adding them to generate a single gradient. In such embodiments, suitable thresholds for the horizontal and vertical gradients would be used.

Embodiments of the methods and encoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. An encoder comprising:
a coding component configured to output a largest coding unit (LCU) of an image in a video sequence; and
a partitioning component configured to:
   determine a first statistical measure of the LCU;
   determine a second statistical measure of the LCU;
   compare the first statistical measure to a first threshold, wherein the first threshold is based on an expected content of the video sequence;
   compare the second statistical measure to a second threshold; and
   responsive to the first statistical measure exceeding the first threshold or the second statistical measure exceeding the second threshold, partition the LCU into a set of child coding units (CUs).

2. The encoder of claim 1, wherein:
the first statistical measure is a variance; and
the second statistical measure is a gradient.

3. The encoder of claim 1, wherein:
the coding component is further configured to:
   receive the video sequence;
   process the video sequence into a plurality of images; and
   divide each of the plurality of images into respective LCUs;
the LCU is one of the respective LCUs; and
the image is one of the plurality of images.

4. The encoder of claim 1, wherein:
the coding component is further configured to:
   responsive to the first statistical measure not exceeding the first threshold and the second statistical measure not exceeding the second threshold, select the LCU as a partition of the image.

5. The encoder of claim 1, wherein:
the coding component is further configured to:
   determine a third statistical measure for a first child CU of the set of child CUs;
   determine a fourth statistical measure for the first child CU the set of child CUs;
   compare the third statistical measure to a third threshold;
   compare the fourth statistical measure to a fourth threshold; and
   responsive to the third statistical measure exceeding the third threshold or the fourth statistical measure exceeding the fourth threshold, partition the first child CU into a second set of child CUs.

6. The encoder of claim 5, wherein:
the coding component is further configured to:
   determine a fifth statistical measure for a second child CU of the set of child CUs;
   determine a sixth statistical measure for the second child CU the set of child CUs;
   compare the fifth statistical measure to the third threshold;
   compare the sixth statistical measure to the fourth threshold; and
   responsive to the fifth statistical measure exceeding the third threshold or the sixth statistical measure exceeding the fourth threshold, partition the second child CU into a third set of child CUs.

7. A method comprising:
determining, by a processor, a first statistical measure of a largest coding unit (LCU) of an image in a video sequence;
determining, by the processor, a second statistical measure of the LCU;
comparing, by the processor, the first statistical measure to a first threshold, wherein the first threshold is based on an expected content of the video sequence;
comparing, by the processor, the second statistical measure to a second threshold; and
responsive to the first statistical measure exceeding the first threshold or the second statistical measure exceeding the second threshold, partitioning, by the processor, the LCU into a set of child coding units (CUs).

8. The method of claim 7, wherein:
the first statistical measure is a variance; and
the second statistical measure is a gradient.

9. The method of claim 7, further comprising:
receiving, by the processor, the video sequence;
processing, by the processor, the video sequence into a plurality of images; and
dividing, by the processor, each of the plurality of images into respective LCUs, wherein the LCU is one of the respective LCUs,
wherein the image is one of the plurality of images.

10. The method of claim 7, further comprising:
responsive to the first statistical measure not exceeding the first threshold and the second statistical measure not exceeding the second threshold, selecting, by the processor, the LCU as a partition of the image.

11. The method of claim 7, further comprising:
determining, by the processor, a third statistical measure for a first child CU of the set of child CUs;
determining, by the processor, a fourth statistical measure for the first child CU the set of child CUs;
comparing, by the processor, the third statistical measure to a third threshold;
comparing, by the processor, the fourth statistical measure to a fourth threshold; and
responsive to the third statistical measure exceeding the third threshold or the fourth statistical measure exceeding the fourth threshold, partitioning, by the processor, the first child CU into a second set of child CUs.

12. The method of claim 11, further comprising:
determining, by the processor, a fifth statistical measure for a second child CU of the set of child CUs;
determining, by the processor, a sixth statistical measure for the second child CU the set of child CUs;
comparing, by the processor, the fifth statistical measure to the third threshold;
comparing, by the processor, the sixth statistical measure to the fourth threshold; and
responsive to the fifth statistical measure exceeding the third threshold or the sixth statistical measure exceeding the fourth threshold, partitioning, by the processor, the second child CU into a third set of child CUs.

13. A non-transitory computer readable medium storing software instructions that, when executed by at least one processor, causes a method for determining coding unit (CU) partitioning of a largest coding unit (LCU) of an image in a video sequence to be performed, the method comprising:
determining a first statistical measure of the LCU;
determining a second statistical measure of the LCU;
comparing the first statistical measure to a first threshold, wherein the first threshold is based on an expected content of the video sequence;
comparing the second statistical measure to a second threshold; and responsive to the first statistical measure exceeding the first threshold or the second statistical measure exceeding the second threshold, partitioning the LCU into a set of child CUs.

14. The non-transitory computer readable medium of claim 13, wherein:
the first statistical measure is a variance; and
the second statistical measure is a gradient.

15. The non-transitory computer readable medium of claim 13, wherein the method further comprises:
receiving the video sequence;
processing the video sequence into a plurality of images; and
dividing each of the plurality of images into respective LCUs, wherein the LCU is one of the respective LCUs, wherein the image is one of the plurality of images.

16. The non-transitory computer readable medium of claim 13, wherein the method further comprises:
responsive to the first statistical measure not exceeding the first threshold and the second statistical measure not exceeding the second threshold, selecting, by the processor, the LCU as a partition of the image.

17. The non-transitory computer readable medium of claim 13, wherein the method further comprises:
determining, by the processor, a third statistical measure for a first child CU of the set of child CUs;
determining, by the processor, a fourth statistical measure for the first child CU the set of child CUs;
comparing, by the processor, the third statistical measure to a third threshold;
comparing, by the processor, the fourth statistical measure to a fourth threshold; and
responsive to the third statistical measure exceeding the third threshold or the fourth statistical measure exceeding the fourth threshold, partitioning, by the processor, the first child CU into a second set of child CUs.

18. The non-transitory computer readable medium of claim 17, wherein the method further comprises:
determining, by the processor, a fifth statistical measure for a second child CU of the set of child CUs;
determining, by the processor, a sixth statistical measure for the second child CU the set of child CUs;
comparing, by the processor, the fifth statistical measure to the third threshold;
comparing, by the processor, the sixth statistical measure to the fourth threshold; and
responsive to the fifth statistical measure exceeding the third threshold or the sixth statistical measure exceeding the fourth threshold, partitioning, by the processor, the second child CU into a third set of child CUs.

19. The encoder of claim 1, wherein the second threshold is based on the expected content of the video sequence.

20. The method of claim 7, wherein the second threshold is based on the expected content of the video sequence.

* * * * *